United States Patent
Schnitzer et al.

(10) Patent No.: US 8,827,311 B2
(45) Date of Patent: Sep. 9, 2014

(54) SPRING ELEMENT

(75) Inventors: Rony Schnitzer, Ruggell (LI); Simon Blättler, Haag (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/699,417

(22) PCT Filed: Apr. 14, 2011

(86) PCT No.: PCT/EP2011/001894
§ 371 (c)(1),
(2), (4) Date: Nov. 21, 2012

(87) PCT Pub. No.: WO2011/147503
PCT Pub. Date: Dec. 1, 2011

(65) Prior Publication Data
US 2013/0074641 A1    Mar. 28, 2013

(30) Foreign Application Priority Data

May 25, 2010   (DE) .......................... 10 2010 017 080
Aug. 6, 2010   (DE) .......................... 10 2010 036 894

(51) Int. Cl.
*B62D 1/18* (2006.01)
*F16F 1/18* (2006.01)
*B62D 1/19* (2006.01)
*B62D 1/184* (2006.01)
*G05G 5/06* (2006.01)

(52) U.S. Cl.
CPC . *F16F 1/18* (2013.01); *B62D 1/195* (2013.01); *B62D 1/184* (2013.01); *B62D 1/18* (2013.01); *G05G 5/06* (2013.01)

USPC .............. 280/775; 280/777; 74/492; 74/493; 188/371

(58) Field of Classification Search
USPC .............. 280/775, 777; 74/492, 493; 188/371
See application file for complete search history.

(56) References Cited

U.S. PATENT DOCUMENTS 4,793,204 A   12/1988   Kubasiak
5,029,489 A   7/1991    Burmeister et al.

(Continued)

FOREIGN PATENT DOCUMENTS

DE   28 21 707   11/1978
DE   39 14 608   10/1990

(Continued)

OTHER PUBLICATIONS

International Search Report issued Jul. 6, 2011 in International (PCT) Application No. PCT/EP2011/001894.

(Continued)

*Primary Examiner* — Faye M Fleming
*Assistant Examiner* — Darlene P Condra
(74) *Attorney, Agent, or Firm* — Wenderoth, Lind & Ponack, L.L.P.

(57) ABSTRACT

The invention relates to a spring element including at least one spring tongue for spring-loading a separate locking part of a steering column of a motor vehicle and at least one fastening part for fastening the spring element to a pin of the steering column. The spring element also has at least one carrier arm, preferably at least two carrier arms, arranged opposite each other for carrying along the locking part when the spring element moves.

17 Claims, 12 Drawing Sheets

(56) References Cited

U.S. PATENT DOCUMENTS

| | | | |
|---|---|---|---|
| 5,524,927 | A | 6/1996 | Toussaint |
| 5,547,221 | A | 8/1996 | Tomaru et al. |
| 5,562,307 | A | 10/1996 | Connor |
| 5,580,091 | A | 12/1996 | Doty |
| 5,606,892 | A | 3/1997 | Hedderly |
| 6,139,057 | A | 10/2000 | Olgren et al. |
| 6,276,719 | B1 | 8/2001 | Gartner |
| 6,378,903 | B1 | 4/2002 | Yabutsuka et al. |
| 6,394,241 | B1 | 5/2002 | Desjardins et al. |
| 6,592,148 | B2 | 7/2003 | Byers et al. |
| 7,188,867 | B2 | 3/2007 | Gatti et al. |
| 7,350,815 | B2 * | 4/2008 | Spano et al. ............ 280/775 |
| 7,422,239 | B2 | 9/2008 | Ishibashi et al. |
| 7,685,903 | B2 * | 3/2010 | Streng et al. ............ 74/493 |
| 7,703,804 | B2 | 4/2010 | Cymbal et al. |
| 7,721,620 | B2 * | 5/2010 | Matsui et al. ............ 74/493 |
| 7,735,868 | B2 * | 6/2010 | Ridgway et al. ............ 280/775 |
| 7,866,699 | B2 * | 1/2011 | Levin et al. ............ 280/777 |
| 7,891,268 | B2 | 2/2011 | Park |
| 7,896,395 | B2 | 3/2011 | Cymbal et al. |
| 7,963,561 | B2 * | 6/2011 | Waibel et al. ............ 280/777 |
| 8,006,587 | B2 * | 8/2011 | Schnitzer et al. ............ 74/493 |
| 8,056,436 | B2 * | 11/2011 | Marable et al. ............ 74/493 |
| 8,065,931 | B1 * | 11/2011 | Marable et al. ............ 74/493 |
| 8,408,089 | B2 | 4/2013 | Oshita et al. |
| 2003/0000330 | A1 | 1/2003 | Murakami et al. |
| 2006/0090586 | A1 | 5/2006 | Lee |
| 2006/0181070 | A1 | 8/2006 | Imamura et al. |
| 2006/0243089 | A1 * | 11/2006 | Cymbal et al. ............ 74/493 |
| 2006/0290128 | A1 | 12/2006 | Ridgway et al. |
| 2007/0137377 | A1 | 6/2007 | Kamei |
| 2007/0252372 | A1 | 11/2007 | Spano et al. |
| 2008/0191457 | A1 | 8/2008 | Ridgway et al. |
| 2008/0229867 | A1 | 9/2008 | Waibel et al. |
| 2008/0236325 | A1 | 10/2008 | Ridgway et al. |
| 2008/0257097 | A1 | 10/2008 | Graf |
| 2008/0284150 | A1 | 11/2008 | Yamada |
| 2010/0018340 | A1 | 1/2010 | Schnitzer et al. |
| 2010/0031768 | A1 | 2/2010 | Oshita et al. |
| 2010/0275721 | A1 * | 11/2010 | Davies et al. ............ 74/493 |
| 2010/0282016 | A1 | 11/2010 | Oehri et al. |
| 2010/0300237 | A1 | 12/2010 | Ridgway et al. |
| 2010/0300238 | A1 | 12/2010 | Ridgway et al. |
| 2011/0041642 | A1 * | 2/2011 | Havlicek ............ 74/493 |
| 2011/0115206 | A1 | 5/2011 | Sulser et al. |
| 2011/0210537 | A1 * | 9/2011 | Uesaka ............ 280/775 |
| 2012/0024101 | A1 | 2/2012 | Schnitzer et al. |
| 2012/0125139 | A1 * | 5/2012 | Tinnin et al. ............ 74/493 |
| 2012/0266716 | A1 | 10/2012 | Sulser et al. |
| 2013/0118292 | A1 | 5/2013 | Sulser et al. |

FOREIGN PATENT DOCUMENTS

| | | |
|---|---|---|
| DE | 10 2004 051 060 | 1/2006 |
| DE | 10 2005 052 123 | 1/2007 |
| DE | 10 2007 002 091 | 7/2008 |
| DE | 10 2007 003 091 | 8/2008 |
| DE | 10 2008 007 094 | 9/2009 |
| DE | 10 2008 007 093 | 11/2009 |
| DE | 10 2008 016 742 | 11/2009 |
| DE | 10 2010 061 268 | 6/2012 |
| EP | 0 179 690 | 4/1986 |
| EP | 0 323 298 | 7/1989 |
| EP | 0 537 454 | 11/1995 |
| EP | 0 641 705 | 1/1997 |
| EP | 0 802 104 | 10/1997 |
| EP | 1 464 560 | 10/2004 |
| EP | 1 125 820 | 3/2008 |
| EP | 1 955 921 | 8/2008 |
| EP | 1 975 036 | 10/2008 |
| FR | 2 781 748 | 2/2000 |
| FR | 2 840 869 | 12/2003 |
| FR | 2 881 707 | 8/2006 |
| FR | 2 932 143 | 6/2008 |
| GB | 1 584 984 | 2/1981 |
| GB | 2 288 154 | 10/1995 |
| GB | 2 291 58 | 2/1996 |
| GB | 2 311 839 | 10/1997 |
| GB | 2 454 345 | 5/2009 |
| JP | 62-161081 | 10/1987 |
| JP | 7-117685 | 5/1995 |
| JP | 9-2294 | 1/1997 |
| JP | 2004-67012 | 3/2004 |
| JP | 2006-96120 | 4/2006 |
| WO | 96/04162 | 2/1996 |
| WO | 2006/042604 | 4/2006 |
| WO | 2007/048153 | 5/2007 |
| WO | 2008/071306 | 6/2008 |
| WO | 2008/142312 | 11/2008 |
| WO | 2009/047516 | 4/2009 |
| WO | 2009/121386 | 10/2009 |
| WO | 2010/000980 | 1/2010 |
| WO | 2010/009486 | 1/2010 |
| WO | 2009/147325 | 10/2010 |

OTHER PUBLICATIONS

International Search Report issued Mar. 5, 2009 in International (PCT) Application No. PCT/EP2008/009794.

German Search Report dated Feb. 14, 2011 in German Patent Application No. 10 2010 017 080.1.

German Search Report dated Jan. 29, 2009 in German Patent Application No. 10 2008 016 742.8-21.

Japanese Office Action dated Apr. 19, 2013 in Japanese Patent Application No. 2011-501108.

U.S. Office Action dated Apr. 11, 2014 in U.S. Appl. No. 13/994,213.

* cited by examiner

SPRING ELEMENT

BACKGROUND OF THE INVENTION

The invention relates to a spring element comprising at least one spring tongue for spring-loading a separately implemented arresting part of a steering column of a motor vehicle and at least one securement part for securing the spring element on a bolt of the steering column.

Generic spring elements are utilized in the prior art, for example in adjustable steering columns, for the purpose of connecting with one another a first structural part of the steering column, such as a vehicle-stationary bracket unit, with a second structural part of the steering column, such as a steering spindle bearing unit, in which a steering spindle is rotatably bearing-supported. Thus, an arresting part secured on one of the two structural parts is arrested by the spring tongue of the spring element in at least one operating state in or on an engagement element secured on the other structural part. In a second operating state of the steering column, however, this arrester is to be released, for example in order to displace the two structural parts of the steering column into a different position relative to one another. For this purpose it must be possible to release the arresting part from the engagement element. Generic spring elements provided herefor, are disclosed, for example, in WO 2009/121 386 A1. In the first embodiment of WO 2009/121 386 A1, the spring tongue is guided fixedly in a groove of the hook-like arresting part. During a swiveling of the spring element therefore the arresting part is entrained in all directions by the spring tongue. In a second embodiment of WO 2009/121 386 A1, the spring tongue rests only on the arresting part. During a corresponding swivel movement of the bolt, on which the spring element is seated, the spring tongue is raised from the arresting part. In order for the arresting part to be released from the engagement element during a corresponding rotational movement of the bolt, in this second embodiment a pin is provided on the bolt of the steering column, which is guided in an elongated hole of the arresting part and entrains the arresting part as soon as the pin abuts one end of the elongated hole.

SUMMARY OF THE INVENTION

The invention addresses the problem of providing an alternative disposition whose structure is implemented as simply as possible and is simple in production.

This is achieved through a spring body according to the present invention.

The invention thus provides that the spring element comprises additionally at least one entrainer arm, preferably at least two opposingly disposed entrainer arms, for entraining the arresting part during a movement of the spring element. The arresting action of the arresting part is preferably effected through the engagement of the arresting part into an engagement element and can be designated for different purposes of the steering column. Depending on requirements, by switching or by actuation it is feasible to switch on and off the arresting action. The arresting action is effected through the movement of the arresting part between the switched-on and switched-off arresting action. Depending on requirements, the arresting part can, in particular, arrest the position of an adjustable steering column and/or enable a connection of an energy absorption means with a portion of the steering column. For the improvement of the function, it can advantageously be provided that the movement of the arresting part is under spring pre-loading at least in the direction of an end position, preferably in the direction of the switched-on arresting state. The arresting part is implemented as a separate structural part whereby a realization especially well suited for the purpose of arresting is enabled, and the choice of the material can be adapted to the requirements while the spring element can be realized to be especially appropriate for satisfying the spring action and the entrainment effect. In terms of the invention, by entrainment operation or entrainment is to be understood a transmission of the movement between two elements, in particular between the spring element and the arresting part.

Through the realization according to the invention, the spring element is enabled to fulfill a double function. Thus, the spring tongue can preload or load the arresting part in one direction, for example in order to arrest the arresting part on the engagement element. The at least one entrainer arm, which is also a part of the spring element, can be utilized for the purpose of releasing, with the corresponding movement or swiveling of the spring element, the arresting part from the engagement element. Thereby that the spring element fulfills both functions overall a very simple structure results. By using the spring element, in addition, tolerance differences in the several parts are well compensated.

Especially preferred physical forms provide in these terms that the spring element is implemented in one piece, preferably as a reformed sheet metal part. The spring tongue can be a leaf spring. The entrainer arm or arms can also be resilient in order to facilitate assembly in preferred physical forms. The entrainer arms can be disposed opposingly such that between them the arresting part can be disposed. Further preferred physical forms of the invention provide that the spring element comprises a receptor cavity, partially encompassed by walls of the spring element, for receiving at least a portion of the arresting part. The arresting part can in this case at least partially be disposed in the receptor cavity partially encompassed by walls of the spring element.

Apart from the spring element per se, the invention also relates to a configuration with at least one such spring element and with at least one arresting part. In such a configuration, it is in particular provided that the arresting part comprises at least one stop region for the abutment of the entrainer arm or arms on the stop region. The stop region can be a portion of a delimitation of an elongated hole. The spring tongue and the entrainer arm or the spring tongue and the entrainer arms can engage on it at different sides of the arresting part.

Especially preferred physical forms of the invention provide that the spring tongue spring loads the arresting part in all operating positions. Consequently, in such physical forms, a continuous action of the spring tongue onto the arresting part is provided. When the arresting part is in engagement with the engagement element, the spring tongue presses the arresting part securely on or into the engagement element. If, on the other hand, the arresting part is located with its stop region on the entrainer arm or arms, the spring tongue presses the arresting part against the entrainer arm or arms. The arresting part is preloaded in both cases such that an undesirable clattering of the arresting part cannot occur.

To dampen vibrations and/or noises, it can be provided to form the spring element such that it is realized completely or at certain surface regions with a cushioning cover or to dispose cushioning on the spring element.

The configuration according to the invention advantageously comprises in addition at least one bolt. This can be, for example, a clamp bolt known per se of a securement device or energy absorption device of a steering column. Advantageous physical forms provide that the spring element is secured on the bolt, preferably under form closure, by means of the securement part such that it is nonturnable relative to the bolt. The bolt can be guided through a bolt receptor opening of the arresting part. In terms of simple assembly of the spring element and the arresting part on the bolt, preferred physical forms provide that the securement part of the spring element and/or the bolt receptor opening comprise an outwardly open plug-in opening. By means of the particular plug-in opening, the spring element and arresting part can optionally jointly be slid, preferably snapped, onto the bolt in a direction orthogonally to the bolt longitudinal axis.

The bolt receptor opening in the arresting part is advantageously implemented such that the bolt can be rotated, preferably over 360° and more, stop-free in the bolt receptor opening of the arresting part. To this end, the bolt receptor opening, optionally except for the plug-in opening, can have, for example, a circular cross section. Especially preferred physical forms of the invention provide that a rotational movement of the bolt into a first direction is transmittable exclusively by means of the spring tongue onto the arresting part, and a rotational movement of the bolt into a second direction opposite to the first direction is exclusively transmittable by means of the entrainer arm or arms onto the arresting part. The rotational movement herein does not need to be transmitted completely from the spring element onto the arresting part. It is frequently preferred that during a turning of the bolt from its one end position into its other end position of the arresting part comes out of engagement with the engagement element only shortly before reaching the one end position. It can also be desirable to bring about the engagement of the arresting part into the engagement part only shortly before reaching the other end position of the bolt. It is further conceivable and feasible that the bolt, for example in the realization as a clamp bolt, for opening and closing the fixing system of a steering column must be turned about another angular range than is required or desired for the turning of the arresting part between the arresting and the non-arresting position.

The invention also relates to a steering column for a motor vehicle, which comprises at least one first structural part and at least one second structural part. The structural parts are movable relative to one another at least in one operating state of the steering column, and the structural parts are secured or are securable on one another via a securement device and/or an energy absorption device. The steering column is characterized thereby that the securement device and/or the energy absorption device comprise or comprises at least a spring element according to the invention or at least one configuration according to the invention.

One of these structural parts of the steering column can be, for example, a steering spindle bearing unit in which the steering spindle, on which the steering wheel is secured, is rotatably supported. The other of the structural parts of the steering column can be, for example, a so-called bracket unit which is fixed on the motor vehicle itself. Steering columns with two structural parts movable, preferably displaceable, relative to one another are known per se as adjustable steering columns in numerous physical forms within prior art. By displacing the two structural parts, thus for example steering spindle bearing unit and bracket unit relative to one another, the position of the steering wheel can be adapted to the driver. A securement device of the steering column herein comprises at least one position in which the two structural parts can be moved relative to one another for the displacement. The securement device comprises further at least one second position in which the structural parts are fixed relative to one another in their position under form and/or friction closure. It is further known in prior art to provide in steering columns so-called energy absorption devices. These serve the purpose of avoiding in the event of a crash as much as possible an injury of the driver through the impact of the driver onto the steering wheel if the motor vehicle impacts onto an obstacle. Generic energy absorption devices known per se serve for the purpose of the two structural parts of the steering column to be shifted relative to one another under defined conditions in order to absorb the energies occurring during the impact of the driver onto the steering wheel in a manner noninjurious to the driver. The securement devices and energy absorption devices can be integrated as one device. However, they can also be realized as devices separate from one another. The concept according to the invention now comprises equipping such securement devices and/or energy absorption devices of a steering column with a spring element according to the invention or a configuration according to the invention.

BRIEF DESCRIPTION OF THE DRAWINGS

In the following description of the Figures, the embodiments selected as examples are described, wherein preferred physical forms and characteristics of the invention are evident.

DETAILED DESCRIPTION OF THE INVENTION

Similar or identically acting elements are denoted in the Figures by the same reference numbers.

Figure 1:
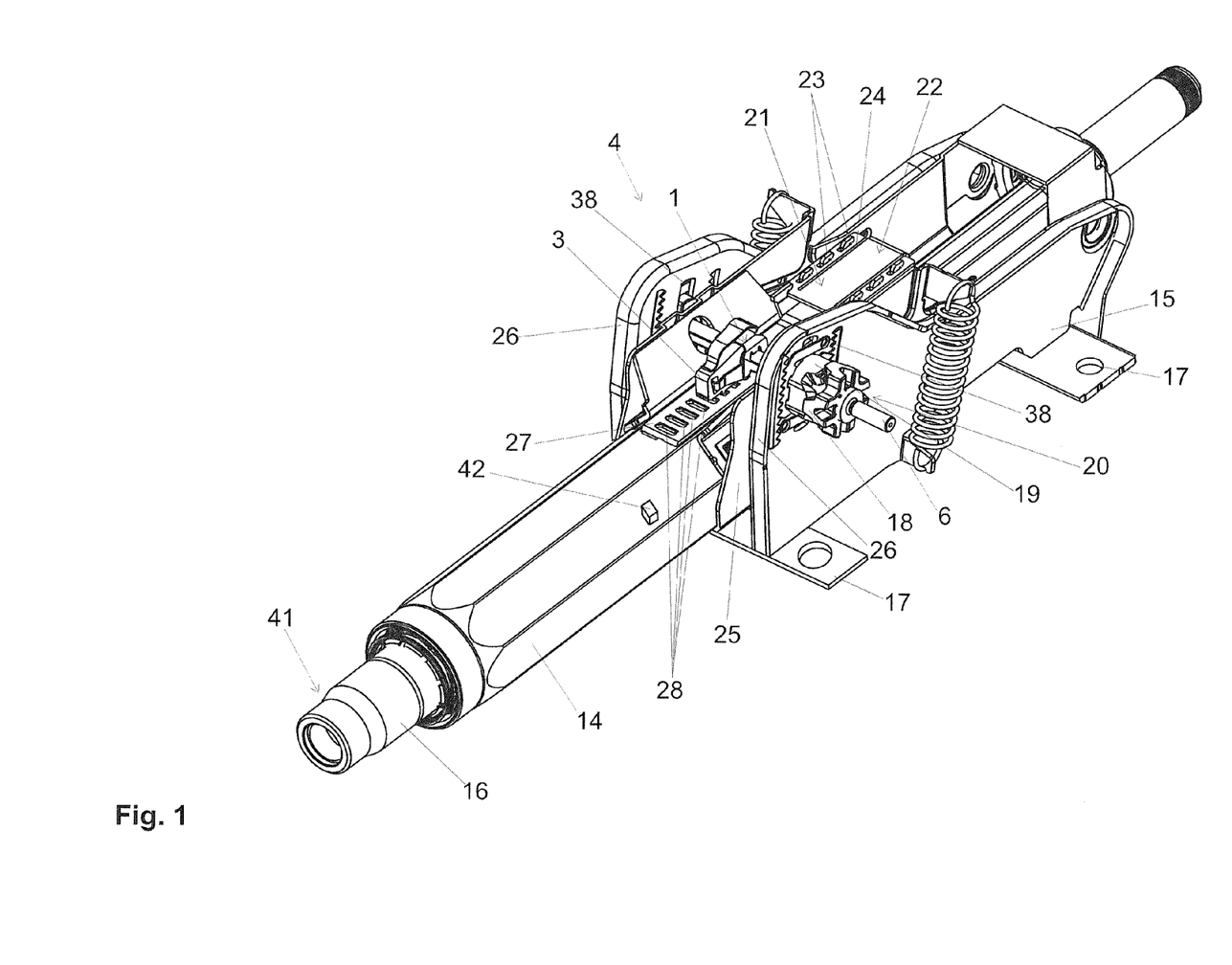
FIG. 1 shows a first embodiment according to the invention of a steering column for a motor vehicle, in which a corresponding configuration of spring element, arresting part and bolt are employed.
Figure 2:
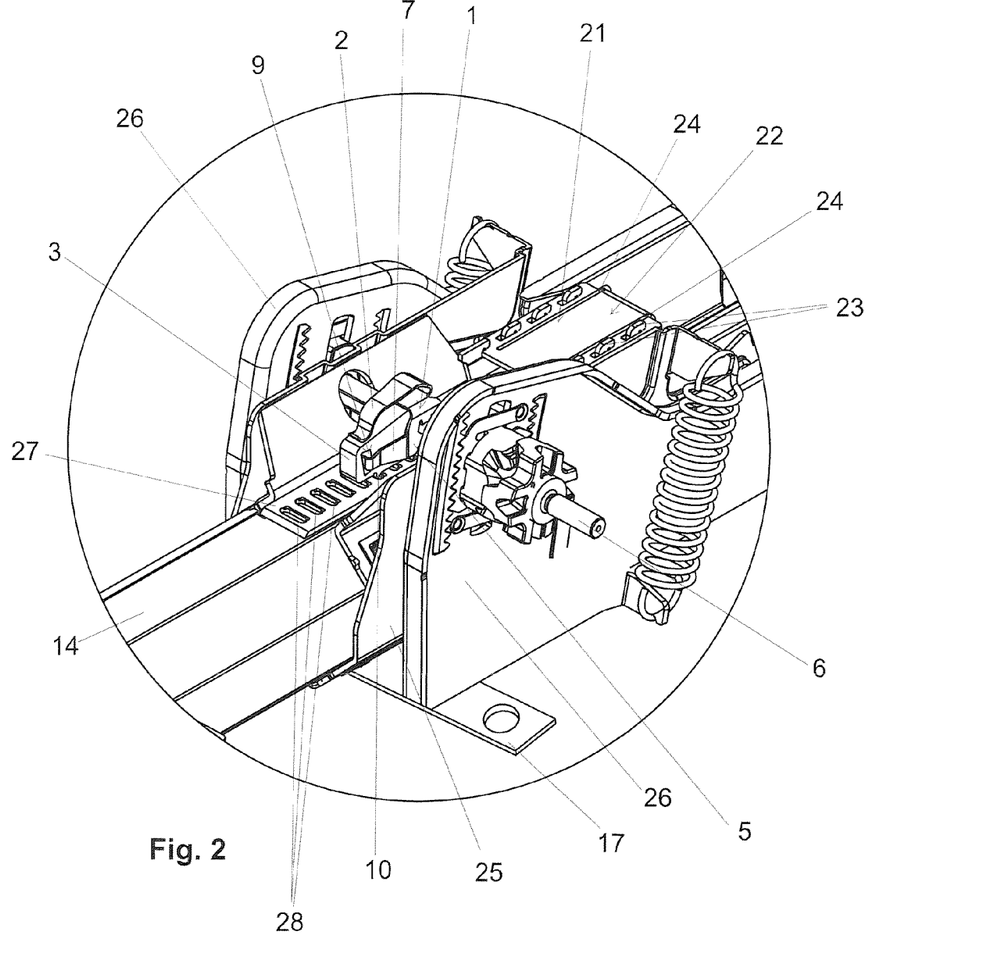
FIG. 2 shows a detail depiction from FIG. 1 in the region of the configuration of the spring element, arresting part and bolt.
Figure 7:
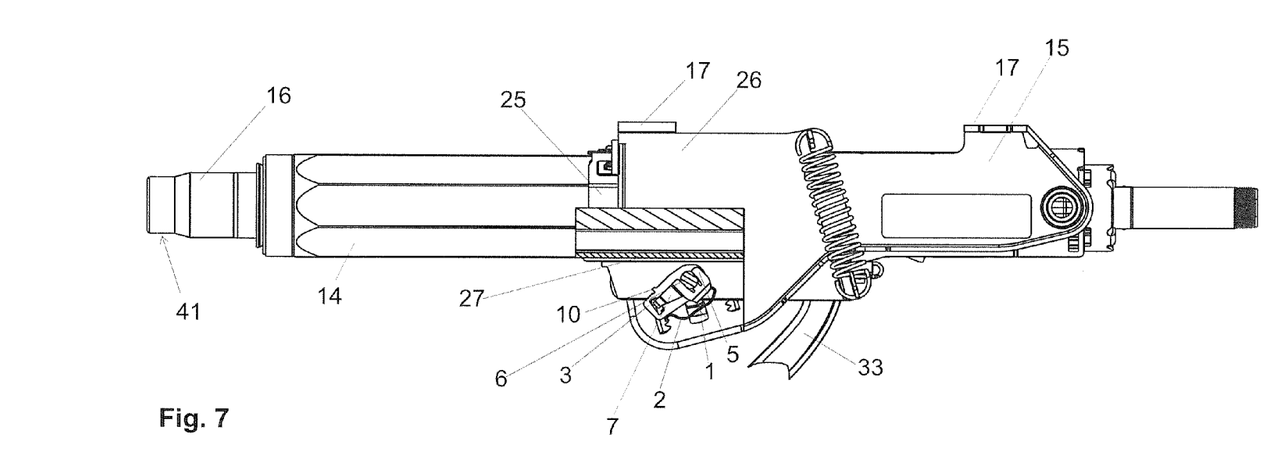
FIGS. 7 and 8 show partially cut depictions related to the first embodiment.
Figure 8:
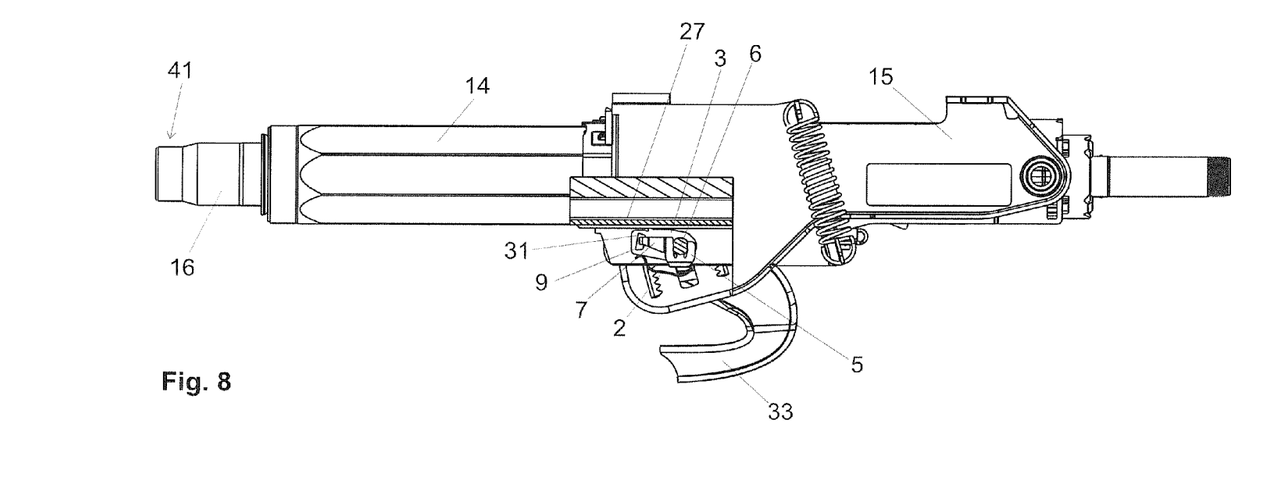

The steering column 4 depicted in FIG. 1 is equipped with a configuration realized according to the invention comprising a spring element 1, an arresting part 3 and a bolt 6. Before discussing these details essential to the invention, first, the structure known per se of the steering column 4 will be briefly described. The steering column 4 comprises as a second structural part 15 a bracket unit provided for securing the steering column 4 on the motor vehicle. The second structural part 15 comprises for this purpose securement plates 17. The first structural part 14 of the depicted steering column 4 is a steering spindle bearing unit in which the steering spindle 16 is rotatably bearing supported. In this embodiment, between the first structural part 14 and the second structural part 15 is disposed an intermediate part 25 as is known per se. The second structural part 15 realized as a bracket unit comprises two side jaws 26, between which the steering spindle bearing unit 14 in the form of the first structural part 14 is fixed, together with the intermediate part 25, in its position when the securement device 20 is in its closed position. In the opened position of the securement device 20 the position of the first structural part 14, in the form of the steering spindle bearing unit, can be displaced relative to the second structural part 15, thus to the bracket unit. As is known per se, the securement device 20 comprises a bolt 6 realized as a clamp bolt. On this bolt a cam disk 18 and a cam follower disk 19 are located. The cam follower disk 19 is secured on the side jaw 26 such that it is torsion-tight. The cam disk 18 is fixed on bolt 6 such that it is perforce turned simultaneously with it. Through the turning of the bolt 6 the securement device 20 can be brought into the opened position as well as also into the closed position. This is known per se and does not require further explanation. To turn the bolt 6 about its longitudinal axis, a motor or the like can be provided. In simple physical forms, for this purpose on bolt 6, (while not shown in FIG. 1, but shown in FIGS. 7 and 8), a manually actuatable lever 33 can be provided. If the securement device 20 is in its opened position, the first structural part 14 can be shifted relative to the second structural part 15, whereby the bolt 6 is simultaneously also shifted in the elongated holes 38 of the side jaws 26. In the depicted embodiment, by means of the securement device 20 in its closed position for the arresting of the height adjustment a form closure is established between the toothings visible on the side jaw. The length adjustment is arrested by means of a friction or force closure between the side jaws. However, the securement device 20 can equally well also be realized such that it acts exclusively under friction or force closure or exclusively under form closure or it can combine friction and form closure. The steering column can also be adjustable in one direction only.

In order to be able to absorb specifically the energy introduced into the steering column 4 in the event of a crash through the impact of the driver onto the steering wheel or the steering spindle 16, the present first embodiment comprises, in addition to the securement device 20, also an energy absorption device 21. In the depicted embodiment, this provides a tear-bend tab 22, which is fixed on the first structural part 14. Alternatively, a pure bending tab or a pure tearing tab can also be provided. This fixing can be attained via the most diverse measures known within prior art. In the depicted physical form, the tear-bend tab 22, however, comprises openings 32, through which hooks 23 fixed on the first structural part 14 are guided. The cooperation of hooks 23 and openings 32 leads to the desired securement of the tear-bend tab 22 on the first structural part 14. The tear-bend tab 22 comprises in the depicted embodiment a tab section 27 in which a sequence of recesses 28 is depicted. Into these recesses 28 the arresting part 3 can engage with its at least one arresting tooth 10. The arresting part 3 can be realized as a catch, as a hook or the like. As is also realized in the depicted embodiment, the arresting part 3 is preferably disposed on the bolt 6 such that it is swivellable.

In the depicted embodiment the tab section 27 with its recesses 28 serves as an engagement element into which the arresting part 3 can engage with its arresting tooth 10. The engagement element or the tab section 27 is herein fixed on the first structural part 14 in the described manner. Due to its bearing, the arresting part 3 is swivellably, but otherwise fixedly, secured on the bolt 6 on the second structural part, thus on the vehicle-stationary bracket unit. If, in the event of a crash, there occurs an impact of the driver on the steering wheel, not depicted here and to be attached on the mounting neck 41 of the steering spindle 16, and therewith on the steering spindle 16, the latter, together with the spindle bearing unit in the form of the first structural part 14, is shifted in the longitudinal direction of the steering spindle 16 into the bracket unit in the form of the second structural part 15. With corresponding energy introduction, the bending-over and tearing-open of the tear-bend tab 22 occurs at the attenuations 24, since the tear-bend tab 22, as already described, is secured, on the one hand, on the first structural part 14 and, on the other hand, via the arresting part 3 also on the second structural part 15. A stop 42 can herein be provided which delimits the displacement in the longitudinal axis and which breaks away after a predefined force has been exceeded, and therewith enables further dislocation during which the energy absorption takes place via the tear-bend tab 22.

Regarding the physical form of the tear-bend tab 22 it should be noted that through a realization of the tab in which the tab is torn open along the attenuation 24 the tear-bend tab 22 is converted in simple manner into a pure bending tab 22a while maintaining the same formation. It is in any event also advantageous for a connection region to remain between the tab section and the holding region in which the openings 32 are located for receiving the hooks 23.

Figure 3:
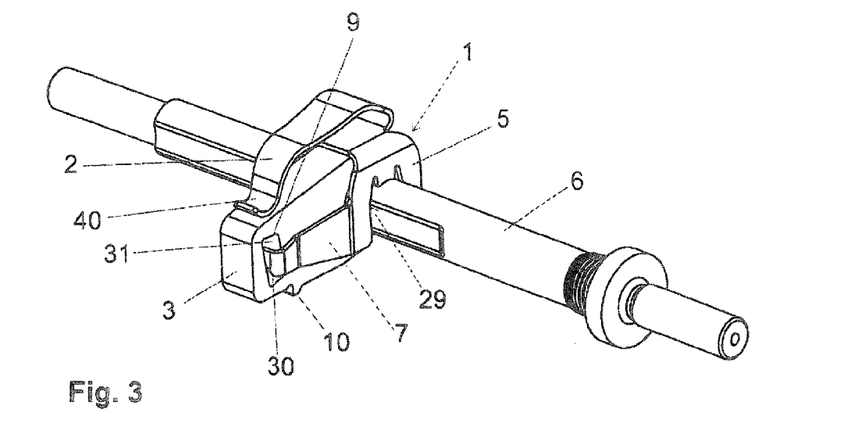
FIGS. 3-5 show select structural parts of this first embodiment, detached from the remainder of the steering column.

The fundamental structure is known per se and disclosed, for example, in WO 2009/121 386 A1 and can be realized in many diverse physical forms. With respect to the configuration realized according to the invention of spring element 1, arresting part 3 and bolt 6 of the first embodiment, reference is now made to FIGS. 3 to 6. The configuration can be better visualized here since other structural parts of the steering column 1 are not shown in FIGS. 3 and 4, and in FIGS. 5 and 6 additionally only the tear-bend tab 22 is depicted. The spring element 1 comprises the securement part 5, the spring tongue 2 and, additionally in the depicted embodiment, two entrainer arms 7. In the proximity of the securement part 5 between walls of the spring element 1 or securement part 5 a receptor cavity 8 is formed in which a portion of the arresting part 3 is disposed in the assembled state according to the Figures. The spring tongue 2 advantageously comprises, as is also realized in the embodiment depicted here, a rounded press-on section 40. This ensures in every position an optimal force introduction from the spring tongue 2 into the arresting part 3. The securement part 5 of the spring element 1 comprises recesses realized such that after the securement part is placed on the bolt 6, this element is held via form closures 29 nonturnably on the bolt 6. This means that every rotational movement of the bolt 6 about its longitudinal axis is perforce also simultaneously carried out by the spring element 1. The form closure 29 is advantageously realized such that the spring element 1 can be placed onto the bolt 6 from a direction orthogonal to the longitudinal direction of bolt 6. For this purpose the securement part 5 comprises, for one, the plug-in opening 35. For another, the walls of spring element 1 forming the form closure on the side of the securement part are advantageously realized such that, with respect to one another, they extend parallel or in the shape of a U or V. It is understood that a corresponding form closure can also be realized through other physical forms. The spring tongue 2, which in the depicted embodiment is realized as a leaf spring, advantageously presses continuously onto the arresting part 3. In the position depicted in FIGS. 5, 6, and 8 this leads to the arresting tooth 10 of the arresting part 3 being pressed against the engagement element or the tab section 27. If the tear-bend tab 22 and the arresting tooth 10 are oriented appropriately with respect to one another, this leads to the arresting tooth 10 being pressed into one of the recesses 28. However, it may also occur that the arresting tooth 10 comes to lie on an intermediate web between two adjacent recesses 28. If this is the case, the arresting tooth 10 in the event of a crash initially slides over this intermediate web and subsequently, due to its spring loading by means of the spring tongue 2, snaps into the next recess 28. In the final analysis, in both cases the arresting of the tab section 27 occurs via the arresting part 3 on bolt 6 and therewith on the second structural part 15. If a displacement of the two structural parts 14 and 15 is to be carried out, then in the first embodiment the manually actuated lever 33 is swiveled into the position according to FIG. 7. The securement device 20 hereby comes into the opened position. During this swivel or rotational movement of the bolt 6 about its longitudinal axis, it also entrains spring element 1 via the form closure 29. Starting at a certain swivel angle, the abutment of the entrainer arms 7 on the stop region 9 of the arresting part 3 occurs, which raises the arresting tooth 10 from the tab section 27. In preferred physical forms in this position according to FIG. 7 it is still provided that the spring tongue 2 spring-loads the arresting part 3 and presses it against the entrainer arms 7. This prevents clattering of the arresting part 3 on the bolt from occurring. In the first embodiment the stop region 9 is realized as a delimitation of an elongated hole 31 in the arresting part 3. However, such does not need to be the case, as the following embodiments will show.

For the sake of completeness, reference is made to the fact that on the arresting part 3 and engagement element, instead of the arresting tooth 10 and the recesses 28, other projections, structural parts or other elements can also be disposed with which the arresting part 3 and the engagement element, here the tab section 27, come into engagement with one another.

Figure 4:
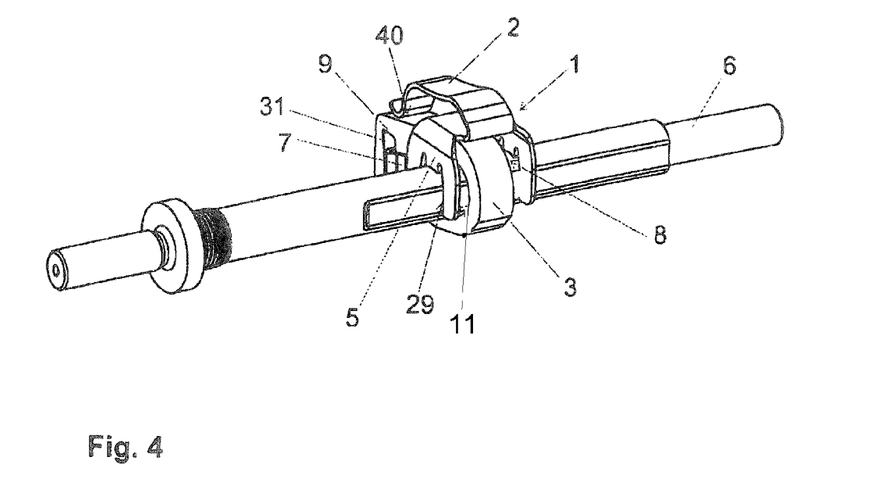
Figure 5:
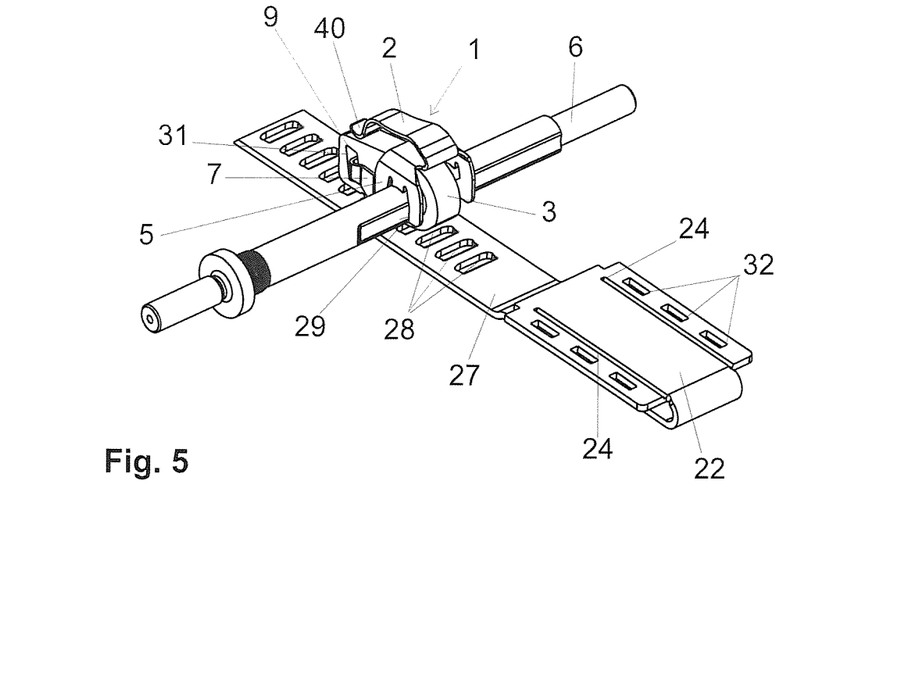

In the first embodiment, as can be seen in FIG. 4, the bolt receptor opening 11 in the arresting part 3 is realized as a completely circular hole. As a consequence the arresting part 3, if no spring element 1 is emplaced, can be freely rotated over more than 360° on the bolt 6. For another, the consequence is that the arresting part 3 of this first embodiment must be slid onto the bolt 6 in its longitudinal direction. Assembling the spring element 1 can take place by emplacing it from a direction orthogonal to the longitudinal direction of the bolt. For this purpose the entrainer arms 7 are advantageously implemented such that they are resilient such that when they are placed onto the arresting part 3 with their hook-shaped extensions 30 they are initially flexed apart and subsequently snap resiliently into the elongated hole 31 in the arresting part 3. It would alternatively also be feasible to bend the entrainer arms 7 initially appropriately far apart and subsequently bend them toward one another such that they or their hook-shaped extensions 30 engage into the elongated hole 31.

Through the described physical form of spring element 1 and arresting part 3 it is in any event ensured in the first as well as also in the other embodiments that a rotational movement of the bolt 6 into a first direction 12 is exclusively transmittable by the spring tongue 2 onto the arresting part 3, and a rotational movement of the bolt 6 into a second direction 13 opposite the first direction is transmittable exclusively by means of the entrainer arms 7 onto the arresting part 3.

Figure 6:
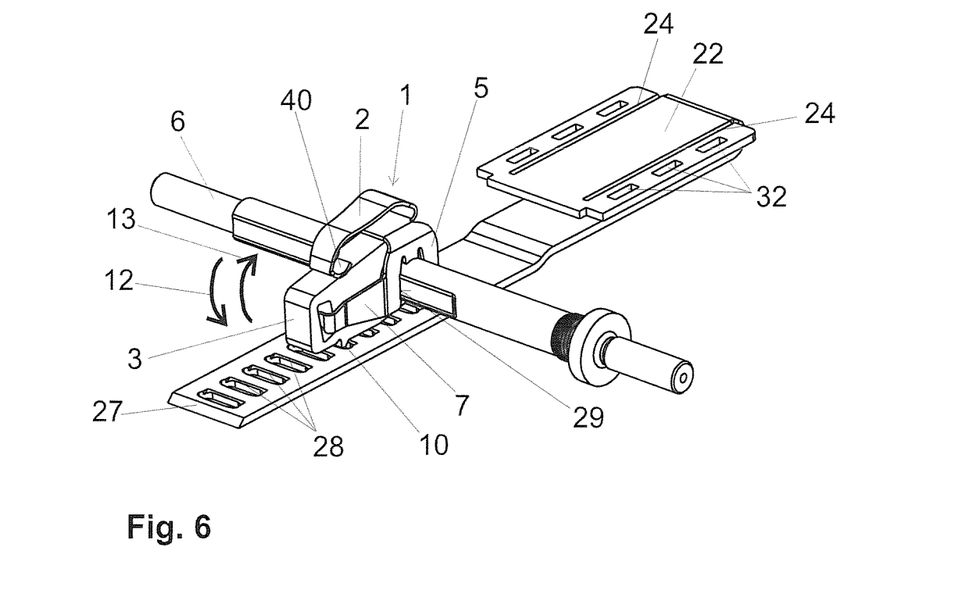
FIG. 6 shows a depiction analogous to FIGS. 3-5 with an alternative embodiment form of the spring element.

In FIG. 6 an alternative embodiment form of the spring element 1 is exemplified, in which the rounded press-on section 40 of the spring tongue 2 is oriented in the direction of the bolt 6. Thereby a prestress in the direction of bolt 6 is effected which can fulfill additional functions.

Figures 9, 10, 26, 27:
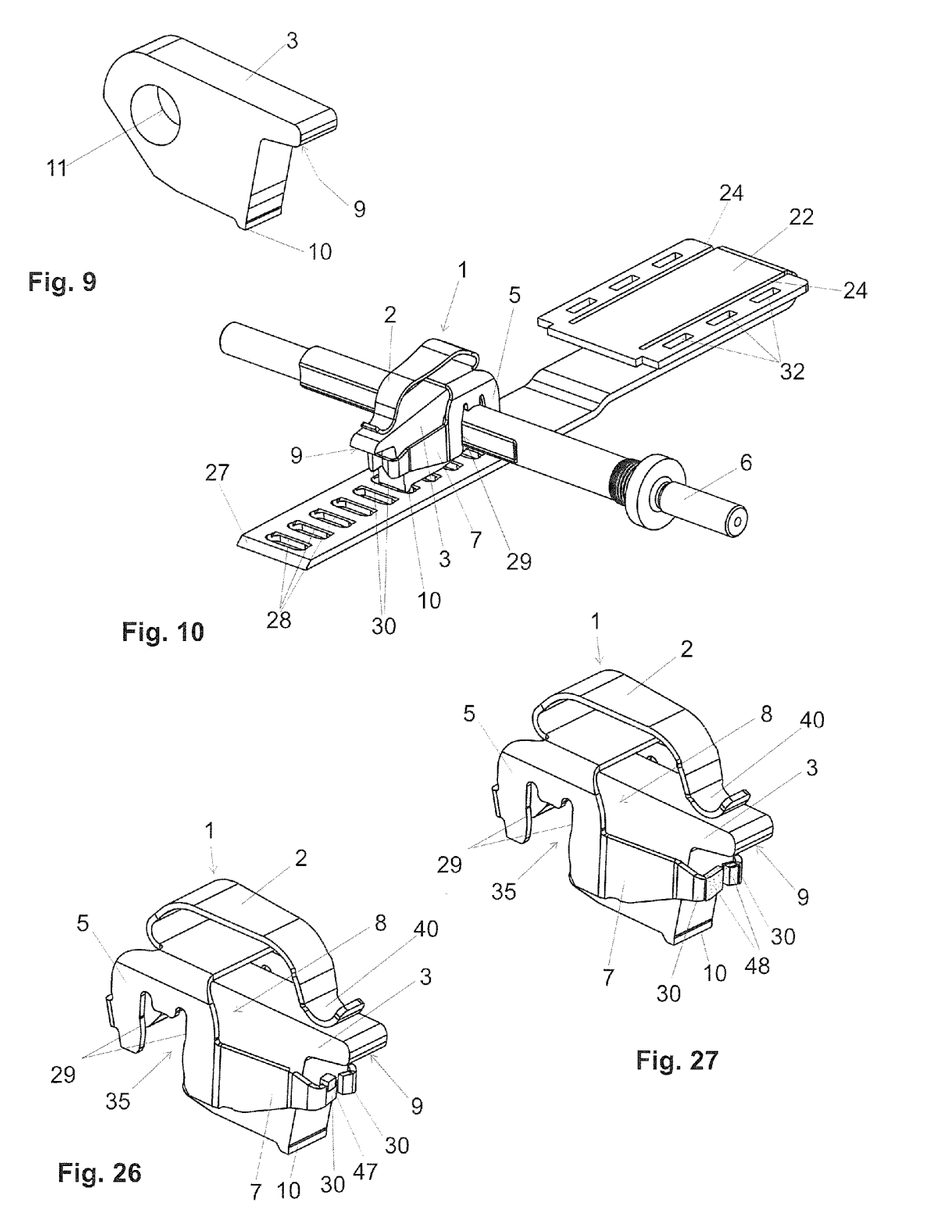
FIGS. 9-11 show depictions of parts of a second embodiment according to the invention.
FIGS. 26 and 27 shows examples of a spring element with cushioning.

In FIGS. 26 and 27 a spring element with a cushioning is exemplified. In FIG. 26 on the hook-shaped extension is disposed a cushioning element 47 for cushioning the contact with the stop region 9 of the arresting part 3. The cushion is preferably formed of rubber or a synthetic material. In FIG. 27 the hook-shaped region is coated with a cushioning layer 48 which, again, is preferably comprised of synthetic material or rubber. The cushioning layer 48 can be applied onto the desired regions of the spring element 1 in simple manner by immersion. The cushioning can alternatively also be disposed on the arresting part 3 in the stop region 9 or on another suitable site.

Figure 11:
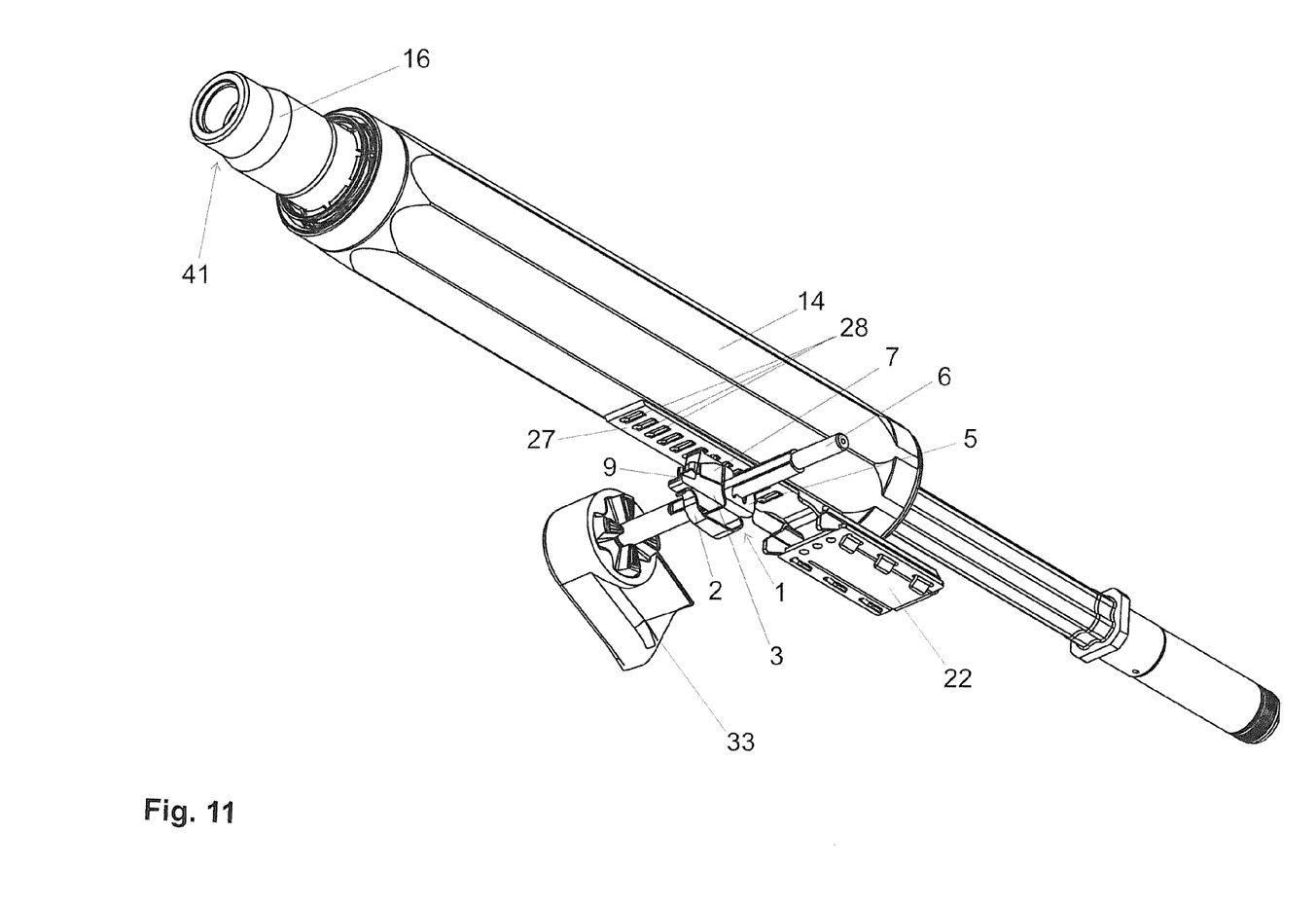

With reference to FIGS. 9 to 11, a second embodiment according to the invention will be described. The structural parts of the steering column 4 not depicted in these Figures can be realized, for example, as in the first embodiment. The essential difference of this second embodiment is to be seen in the implementation of the arresting part 3. The arresting part 3 does not comprise an elongated hole 31 here, but rather only a single web-like projecting stop region 9, on which the entrainer arms 7 or their hook-shaped extensions 30 can abut in order to raise the arresting part 3 from the tab section 27. The arresting tooth 10 of the arresting part 3 is here also realized as in the first embodiment in the form of a bar. The longitudinal extent of the bar-shaped implementation form extends parallel to the swivel axis through the bolt receptor opening 11.

Figure 12:
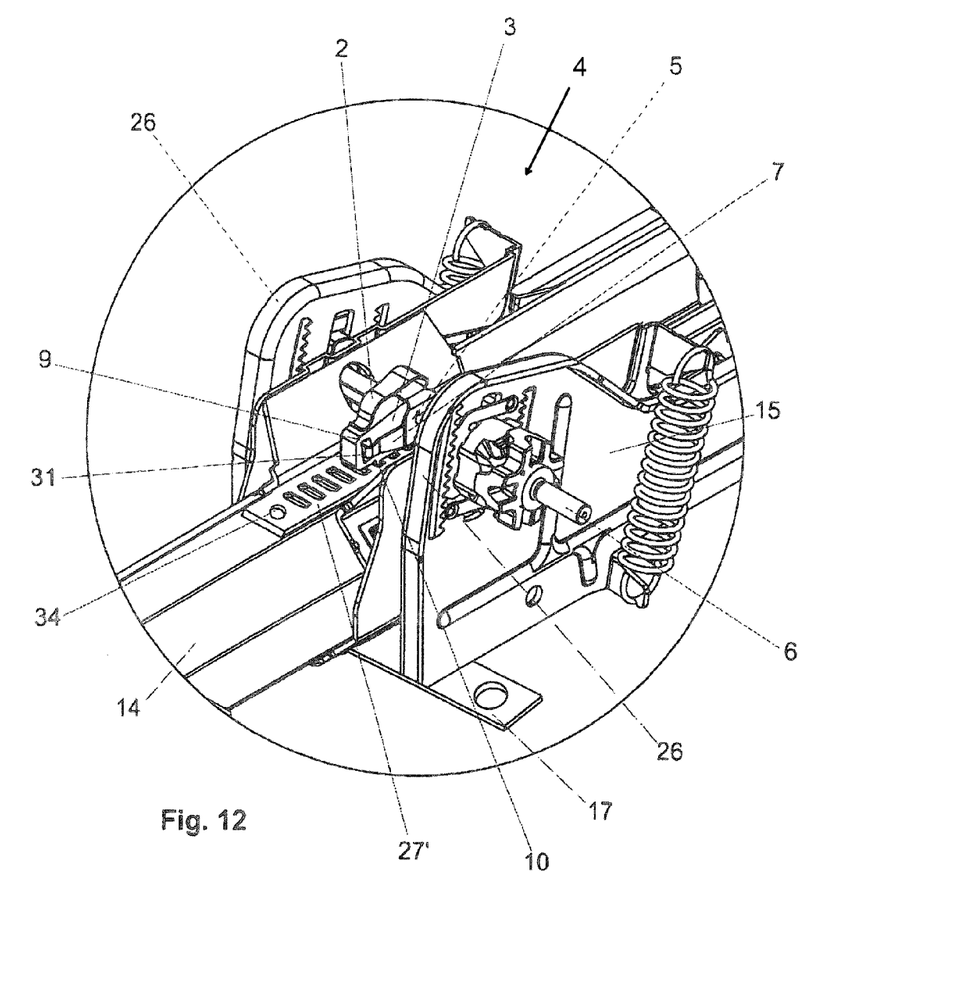
FIG. 12 shows a detail of a third embodiment according to the invention.

In the first embodiments according to FIGS. 1 to 11 the configuration of spring element 1, arresting part 3 and bolt 6 forms a portion of the energy absorption device 21. FIG. 12 shows a steering column 4 realized according to the invention in which the energy absorption device 21 was omitted. Here, the configuration of spring element 1, arresting part 3 and bolt 6 forms a portion of the securement device 20. This is attained in the depicted embodiment thereby that the tab section 27' is fixedly secured on the first structural part 14. This can be achieved through welding or other securement measures. In the depicted embodiment the securement of the tab section 27' on structural part 14 takes place inter alia by means of a rivet 34. It is alternatively also conceivable and feasible to integrate the recesses 28 directly into the first structural part 14. The recesses can also be replaced by projections which cooperate with the arresting tooth 10 for the formation of the form closure. In such embodiments the arresting part 3 can be employed, for example, for the purpose of ensuring at opened securement device 20 that the structural part 14 can be displaced orthogonally to its longitudinal direction, not however in its longitudinal direction relative to the second structural part 15. However, this should only be considered an example.

Figure 13:
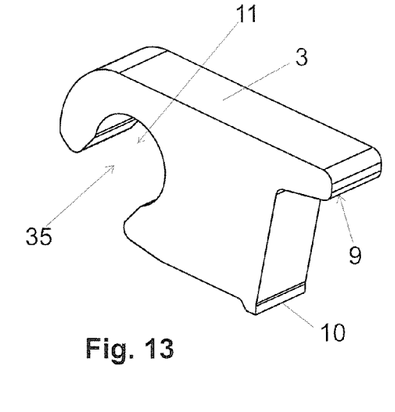
FIGS. 13 and 14 show alternative physical forms of an arresting part.
Figure 15:
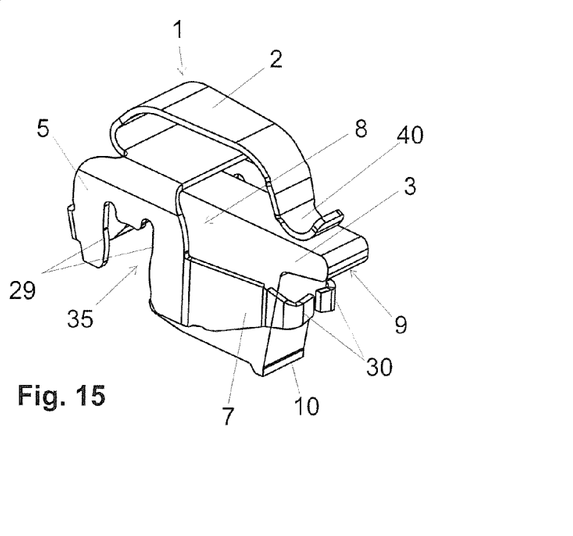
FIGS. 15 and 16 show the arresting part from FIG. 13 with superjacent spring element.
Figure 16:
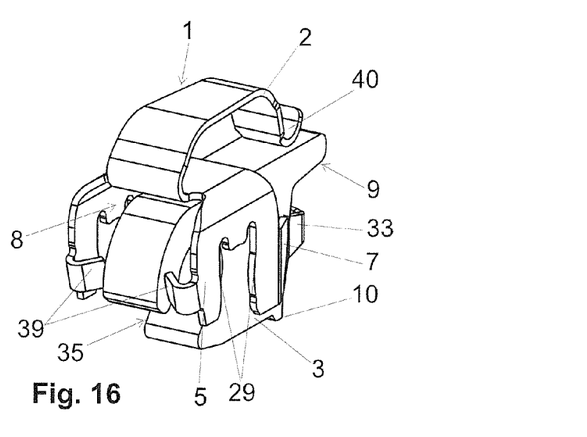

FIG. 13 shows a further embodiment of an arresting part 3. The bolt receptor opening 11 of the arresting part 3 comprises an outwardly open plug-in opening 35. This permits emplacing the configuration of spring element 1 and arresting part 3 jointly from a direction orthogonal to the longitudinal axis of the bolt onto the latter which enables an especially simple assembly. The FIGS. 15 and 16 show a configuration of spring element 1 and arresting part 3 according to FIG. 13 in views from different directions. In the view from behind according to FIG. 16 the two centering jaws 39 disposed on the spring element 1 can be seen which ensure that the arresting part 3 cannot become canted in the receptor cavity 8. Corresponding centering jaws 39 can be realized in every physical form of a spring element 1 shown.

Figure 14:
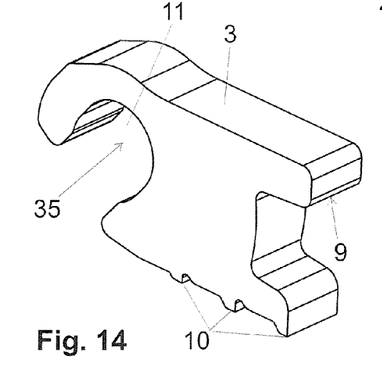

In FIG. 14 is shown an embodiment of an arresting part which illustrates that the arresting part can comprise at least two arresting teeth which are spaced at different distances from the securement device of the spring element and preferably, as also realized here, are implemented in the shape of a bar. In the example according to FIG. 14 the arresting part 3 comprises precisely three arresting teeth 10. All three arresting teeth 10 are realized in the form of a bar, the longitudinal extent of the bar-shaped realizations each extending parallel to the swivel axis. The utilization of several arresting teeth 10 enables the same arresting part 3 to be applied for differently thick tab sections 27 or engagement elements. It is also feasible to provide several arresting teeth 10 in order to effect redundancy of the form-closure connection if, for example in the event of a crash, an intermediate web of the tap section 27 or an arresting tooth 10 is so deformed that it no longer holds. The embodiment according to FIG. 14 also comprises a bolt receptor opening 11 with an outwardly open plug-in opening 35 such that this arresting part 3 can be plugged onto the bolt 6 from a direction orthogonal to the longitudinal axis of same.

Figure 14A:
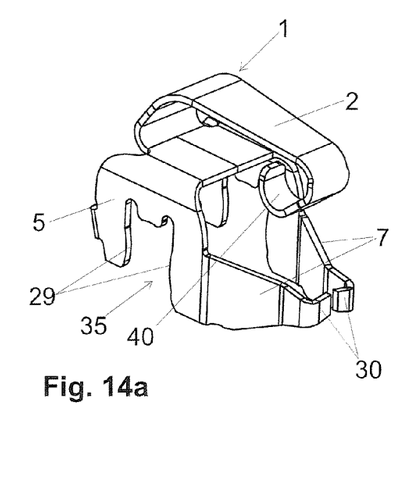
FIG. 14a shows an alternative variant of the spring element, such as can be employed, for example, in an arresting part according to FIG. 14.

FIG. 14a shows a spring element 1 in particular suitable for the arresting part 3 according to FIG. 14. This spring element 1 differs in terms of realization of the rounded press-on section 40 of the spring tongue 2 from the previously described spring element 1. In FIG. 14a, this rounded press-on section 40 is realized in a region of the spring tongue 2 bent away at an angle in the direction toward the securement part 5. This results in the formation of a force component onto the arresting part 3 which presses the arresting part 3 onto the bolt 6 disposed in the bolt receptor opening 11.

In particular through this realization, the arresting part 3 is able to shift with its bolt receptor opening 11 with respect to the bolt 6 such that bolt 6 is positioned shifted with respect to the arresting part 3 in the direction of, with respect to the arresting part 3, the plug-in opening 35. Due to the prestress, the spring tongue 2 ensures with the press-on section 40 the secure engagement of the arresting tooth or teeth into the recesses 28. Such a shift can be expedient in order to effect a "deeper incarving" of the arresting tooth or teeth when moving the steering spindle 16 with respect to the bracket, the second structural part 15. Through the "deeper incarving" or the cut-back, the form closure can be improved or maintained even at incipient deformation of the recesses 28 in the tab section. The shifting can also serve for a tolerance compensation and enable employing tabs 27 of different thicknesses at otherwise identical structural parts, as can be expedient for different motor vehicle constructions.

Figure 22:
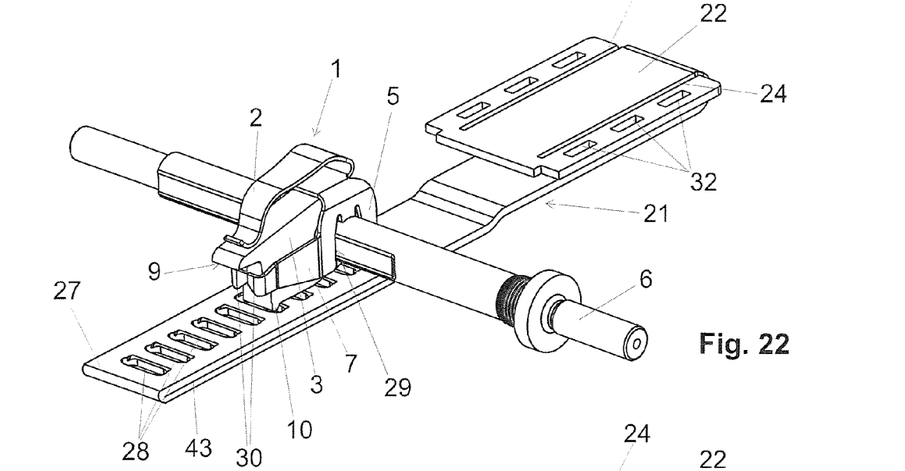
FIGS. 22 and 23 shows examples of alternative implementations of the bending or tearing tabs in cooperation with the arresting part and the spring element.
Figure 23:
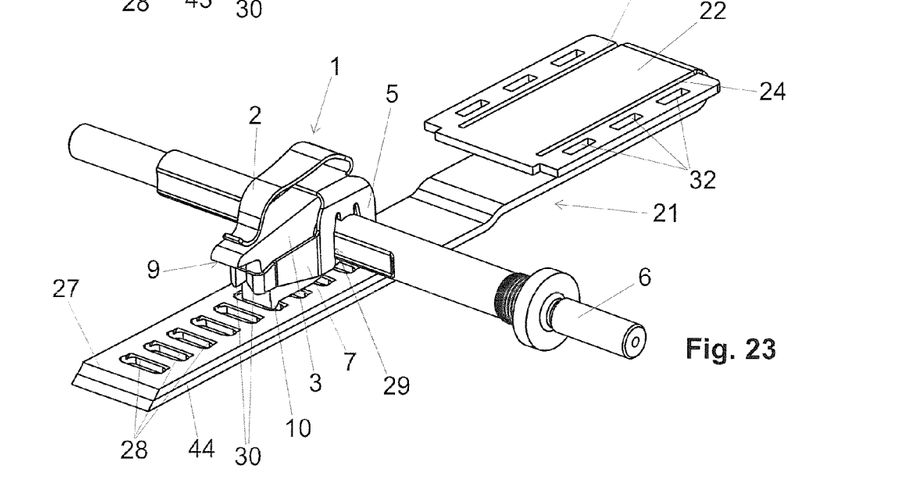

Further improvement of the form closure between the arresting part 3 and the engagement element can be attained through the improved form of that region of the energy absorption device 21 in which the recesses 28 for the engagement of the arresting part 3 are located. Examples thereof are illustrated in FIGS. 22 and 23. It is conceivable and feasible to crimp over the tab 27 and herein to return it as tab 43 approximately congruently with tab 27. In this tab section 43 are also introduced recesses approximately correspondingly or approximately congruently to the recesses 28. The one arresting tooth 10 or the several arresting teeth 10 on arresting part 3 are preferably longer in order to be able to engage into corresponding recesses 28 of tab 27 and the tab 43. In this manner it becomes feasible to increase the force of resistance against the deformation of the recesses.

Alternatively to an integral, one-piece embodiment, the tab section 27 can be reinforced through a second separately implemented tab 44. The tab 44 is disposed approximately congruently with the tab section 27 and comprises corresponding recesses disposed approximately congruently with recesses 28. Here also arresting teeth 10 are preferably correspondingly longer. The connection between the two tabs 27, 44 can be established by welding, riveting, adhesion or other means. The rivet can even be guided through one of the recesses 28 in both tabs 27, 44 in order to effect the connection. The rivet can be implemented of a synthetic material.

Figure 24:
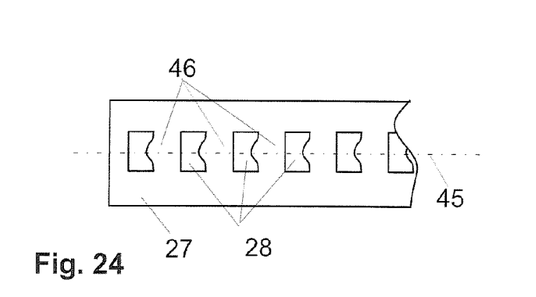
FIGS. 24 and 25 shows examples of the form of the recess and of an arresting tooth.

For increasing the force of resistance against a deformation of the recesses 28, it is further conceivable and feasible to implement these with a special cross sectional form. In FIG. 24 a top view onto the tab section 27 with the recesses 28 is shown. The recesses 28 have a rectangular basic form which have in the proximity of the center axis 45 of the tab section 27 an arcuate narrowing. This means one or several corners of the rectangular cross section are not connected with one another by a straight line but rather by an arcuate line, the distance of the arcuate line from the imaginary straight line between the particular corners increases toward the center axis line 45. The webs 46 between the recesses 28 are thereby reinforced and offer a greater force of resistance against deformation. It suffices correspondingly to reinforce (=provision with corresponding arcuate form) only that side of the recess in the direction of which the resistance force against a dislocation in the arrested state must be absorbed. The arcuate form is mathematically preferably describable through a quadratic polynomial. The recesses are further preferably rounded in the corners in order to decrease stress concentration.

Figure 25:
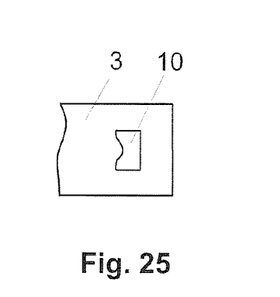

It is further conceivable and feasible to adapt the tooth form of the one arresting tooth 10 or the several arresting teeth 10 to the form of the recess 28. The tooth can in particular have an outer form corresponding (quasi identical) to the inner form of the recess, as is depicted in FIG. 25.

In all of the embodiments depicted here the spring element 1 is implemented integrally in one piece as a reformed metal sheet part.

Figure 17:
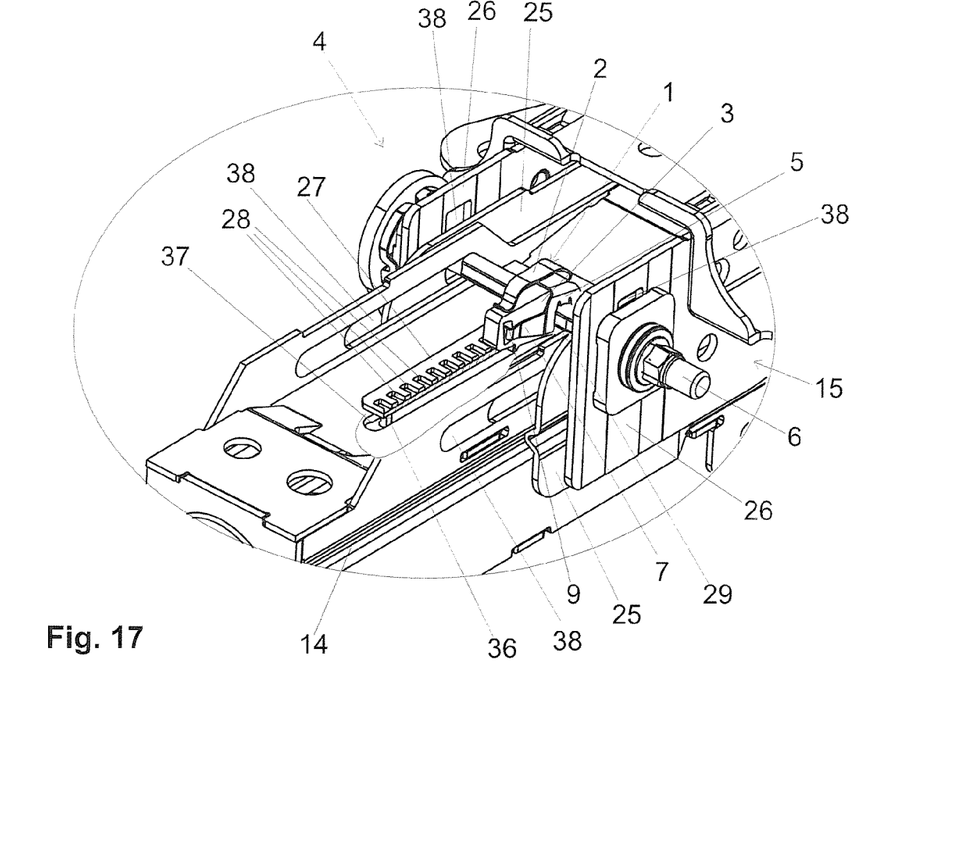
FIG. 17 shows a further embodiment according to the invention.

FIG. 17 shows a detail from a further steering column 4 implemented according to the invention. The configuration of spring element 1 and arresting part 3 as well as bolt 6 corresponds to the first embodiment and does not need to be discussed again. The same applies to numerous further components of the steering column 4. The difference from the previously depicted embodiments lies essentially in the type of energy absorption. Thus, the engagement element in the form of the tab section 27 in the embodiment according to FIG. 17 is not a part of a tear-bend tab. The tab section 27, rather, comprises a deformation bolt 36 which penetrates an elongated hole 37 disposed in the spindle bearing unit or in the first structural part 14. The gap between the side walls delimiting the elongated hole 37, into which the deformation bolt 36 engages, is so narrow that a dislocation of the tab section 27 against the first structural part 14 or the steering spindle bearing unit is only possible by the deformation bolt 36 widening the elongated hole 37. In the event of a crash, energy is hereby absorbed in the desired manner. The form of the elongated hole 37 or the thickness of the delimiting walls can be varied in order to attain a desired energy absorption profile.

Figure 18:
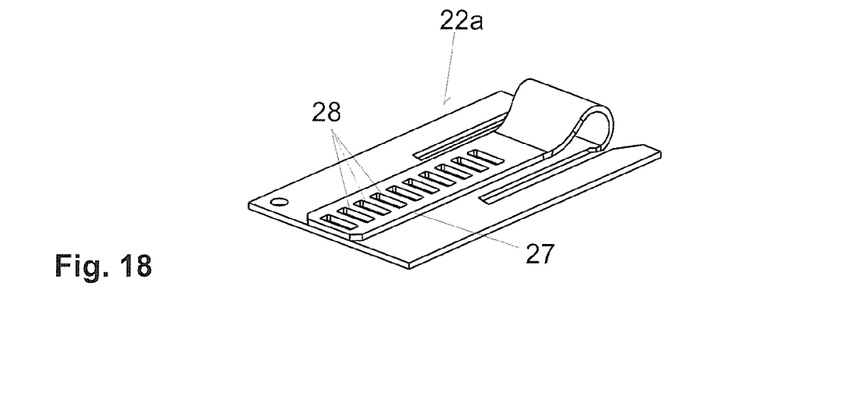
FIGS. 18-21 show several physical forms of suitable bending and tearing tabs.
Figure 19:
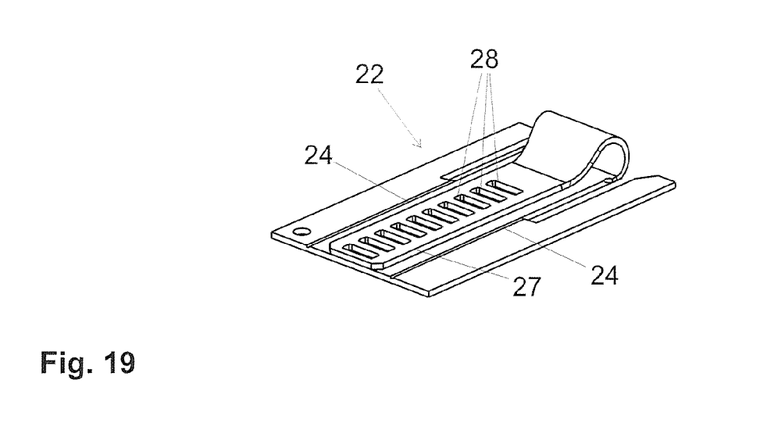
Figure 20:
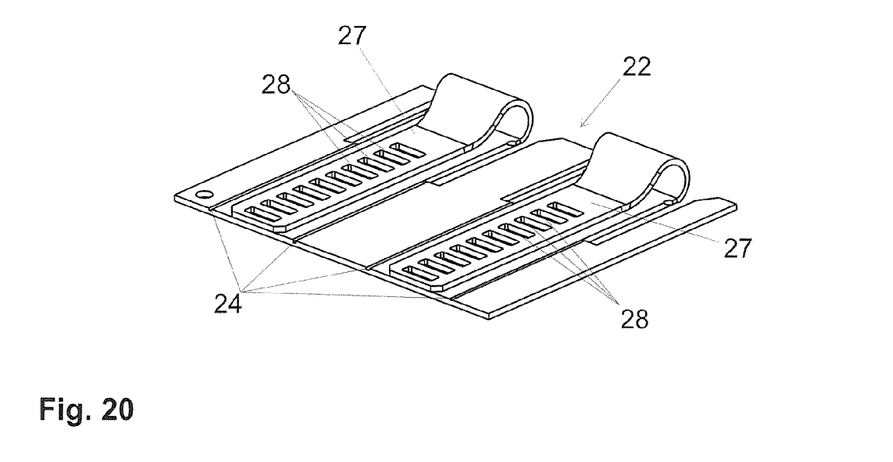
Figure 21:
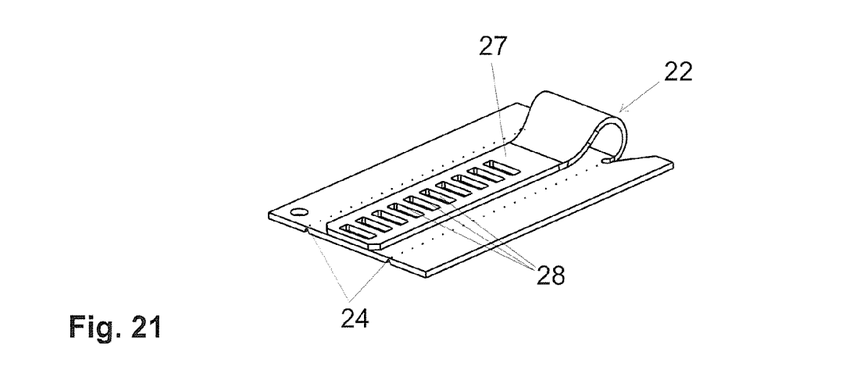

FIGS. 18 to 21 show additionally different physical forms of bending or tear-bend tabs, as these can be utilized alternatively in the previously depicted physical forms of steering columns 4. In FIG. 18 this is a pure bending tab 22a. In FIGS. 19 and 20 these are tear-bend tabs 22 in which the tab is initially only bent over until subsequently tearing along the attenuations 24 occurs with the simultaneous recurving. In FIG. 21 the tearing of the attenuations 24 starts after a relatively short path of pure recurving.

Using two tabs disposed next to each other as examples, FIG. 20 illustrates that it is feasible to dispose several tabs, such as bending tabs, tearing tabs and/or tear-bend tabs, etc., next to one another as energy absorption element.

To the extent applicable or implementable, all of the diverse individual features of the several examples can be interchanged and/or combined among one another without leaving the scope of the invention.

Legend to the Reference Numbers
1 Spring element
2 Spring tongue
3 Arresting part
4 Steering column
5 Securement part
6 Bolt
7 Entrainer arm
8 Receptor cavity
9 Stop region
10 Arresting tooth
11 Bolt receptor opening
12 First direction
13 Second direction
14 First structural part
15 Second structural part
16 Steering spindle
17 Securement plate
18 Cam disk
19 Cam follower disk
20 Securement device
21 Energy absorption device
22 Tear-bend tab
22a Bending tab
23 Hook
24 Attenuation
25 Intermediate part
26 Side jaw
27, 27' Tab section
28 Recess
29 Form closure
30 Hook-shaped extension
31 Elongated hole
32 Opening
33 Lever
34 Rivet
35 Plug-in opening
36 Deformation bolt
37 Elongated hole
38 Elongated hole
39 Centering jaws
40 Rounded press-on section
41 Mounting neck
42 Stop
43 Tab section
44 Strip
45 Center line
46 Web
47 Cushioning element
48 Coating

The invention claimed is:

1. A configuration comprising:
a spring element which includes
a spring tongue for spring-loading a separately implemented arresting part of a steering column of a motor vehicle,
a securement part for securing the spring element on a bolt of the steering column, and
an entrainer arm for entrainment of the arresting part during a movement of the spring element;
an arresting part, wherein the arresting part comprises a stop region for the abutment of the entrainer arm on the stop region; and
a bolt, wherein a rotational movement of the bolt into a first direction is transmittable exclusively by the spring tongue onto the arresting part, and a rotational movement of the bolt into a second direction, opposite to the first direction, is transmittable exclusively by the entrainer arm onto the arresting part.

2. The configuration of claim 1, wherein the spring element is implemented integrally in one piece.

3. The configuration of claim 2, wherein the spring element is a reformed metal sheet part.

4. The configuration of claim 1, further comprising a receptor cavity, partially encompassed by walls of the spring element, for the reception of at least a portion of the arresting part.

5. The configuration of claim 4, wherein the receptor cavity is in the proximity of the securement part.

6. The configuration of claim 1, wherein the spring tongue and the entrainer arm engage on different sides of the arresting part.

7. The configuration of claim 6, wherein the spring tongue spring loads the arresting part in all operating positions.

8. The configuration of claim 1, wherein the arresting part comprises an arresting tooth.

9. The configuration of claim 8, wherein the arresting tooth is shaped as a bar.

10. The configuration of claim 1, wherein the arresting part comprises a plurality of arresting teeth which are located at different spacings from the securement part of the spring element.

11. The configuration of claim 10, wherein the plurality of arresting teeth comprises three arresting teeth in the form of bars.

12. The configuration of claim 1, wherein the spring element is secured by the securement part nonturnably relative to the bolt.

13. The configuration of claim 12, wherein the bolt is guided through a bolt receptor opening of the arresting part.

14. A steering column for a motor vehicle, comprising a first structural part and a second structural part, wherein the first and second structural parts are movable in an operating state of the steering column relative to one another, and wherein the first and second structural parts are securable on one another via a securement device and or an energy absorption device, wherein the securement device and or the energy absorption device comprises the configuration of claim 1.

15. The configuration of claim 1, wherein the entrainer arm comprises at least two entrainer arms disposed oppositely with respect to one another.

16. The configuration of claim 1, wherein the spring tongue spring loads the arresting part in all operating positions.

17. The configuration of claim 1, wherein the bolt is guided through a bolt receptor opening of the arresting part.

* * * * *